United States Patent [19]

Kemmner et al.

[11] 4,134,712

[45] Jan. 16, 1979

[54] FUEL SUPPLY UNIT CONSISTING OF A PUMP AND AN ELECTROMOTOR

[75] Inventors: Ulrich Kemmner, Sachsenheim; Karl Ruhl, Gerlingen; Rainer Schillinger, Stuttgart, all of Fed. Rep. of Germany

[73] Assignee: Robert Bosch GmbH, Stuttgart, Fed. Rep. of Germany

[21] Appl. No.: 792,626

[22] Filed: May 2, 1977

[30] Foreign Application Priority Data

May 3, 1976 [DE] Fed. Rep. of Germany ....... 2619062

[51] Int. Cl.² ............................................. F04B 17/00
[52] U.S. Cl. ................................ 417/423 R; 417/366; 403/302; 64/2 R
[58] Field of Search ................... 417/366, 410, 423 R; 403/254, 261, 263, 301, 302; 64/10, 2 R, 1 V, 6; 415/122 R

[56] References Cited

U.S. PATENT DOCUMENTS

| 3,870,910 | 3/1975 | Fussner | 417/423 R |
| 3,897,179 | 7/1975 | Fussner et al. | 417/366 |
| 3,969,044 | 7/1976 | Fussner et al. | 417/366 |

*Primary Examiner*—C. J. Husar
*Attorney, Agent, or Firm*—Edwin E. Greigg

[57] ABSTRACT

This invention relates to a pump and motor unit which is particularly adapted for supplying fuel and which comprises a pump rotor and motor armature, the bearings of which are disposed independently of each other on a fixed axis.

10 Claims, 5 Drawing Figures

FUEL SUPPLY UNIT CONSISTING OF A PUMP AND AN ELECTROMOTOR

BACKGROUND OF THE INVENTION

The present invention relates to a fuel supply unit consisting of a pump and an electromotor, in which the pump rotor and motor armature are mounted on a common fixed axis and possess a rotation-locking connection. In existing fuel supply units of this type, the pump rotor is either rigidly connected with the motor armature or they are connected together via a tube section which provides common bearing for the pump rotor and motor armature. However, as the stresses which are exerted on the pump rotor bearing in a radial direction are substantially greater than are those forces which are exerted on the motor armature, the end of the shaft which supports the common pump rotor and motor armature bearing is worn far more rapidly than the bearing on the opposite end of the motor armature. This wear is especially marked during dry operation of the pump which occurs occasionally, for example, when the fuel tank is empty and also when using certain newer types of fuel which have relatively poor lubricating properties. Unilateral wear of the bearings has the following disadvantages:

(1) the motor armature no longer operates concentrically with respect to the fixed axis which has a detrimental affect on magnetic forces;

(2) the pump rotor is also inclined as a result of the inclination of the motor armature which results in increased unilateral axial forces between the pump rotor and limiting wall of the pump;

(3) the inclination of the motor armature causes excessive stress to be exerted on the coupling between the pump rotor and the motor armature, thereby causing excessive wear of these elements.

Accordingly, these disadvantages result in excessive current assumption by the electromotor and a reduction in the quantity of fuel supplied as well as reduction in the pressure in the pump thus leading very possibly to failure of the fuel supply system.

OBJECTS AND SUMMARY OF THE INVENTION

The primary advantage of the fuel supply unit according to the present invention resides in the fact that completely different bearings can be used for the pump rotor and the motor armature, with these bearings being made of materials which are adapted to the particular load and type of use.

A further advantage of the invention consists in ensuring that forces are not transmitted from one of the two rotating parts to the other parts thereof.

It is also still another advantage of the invention that the bearings which are arranged to cooperate one with another are rigidly connected to the rotating parts associated therewith.

Yet another object of the invention is to provide a novel rotation-locking connection between the armature and the pump rotor.

The invention will be better understood as well as further objects and advantages thereof become more apparent from the ensuing detailed description of a preferred embodiment taken in conjunction with the drawing.

BRIEF DESCRIPTION OF THE DRAWING

Four embodiments of the invention will be described in greater detail hereinafter with reference to the accompanying drawings, in which.

DESCRIPTION OF THE PREFERRED EMBODIMENTS

Figure 1:
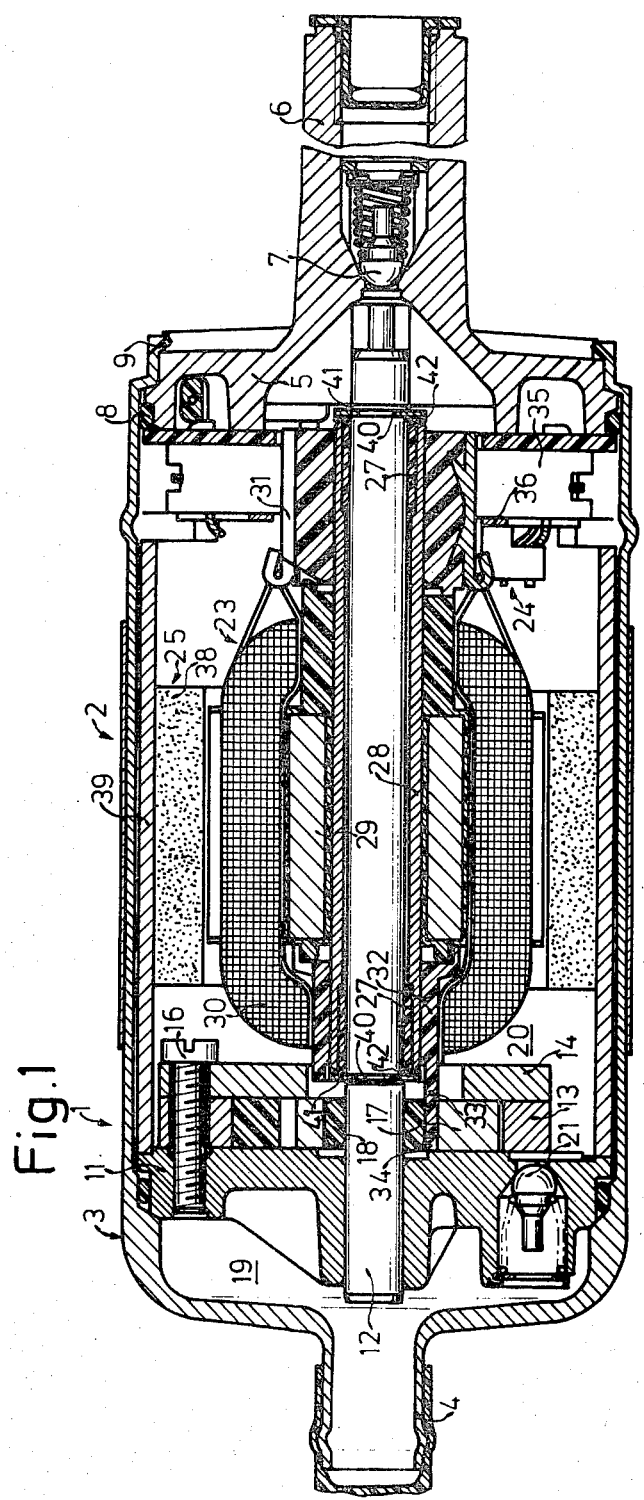
FIG. 1 is a longitudinal sectional view of the first embodiment of the entire fuel supply unit.

Turning now to the drawings, the fuel supply unit comprises a fuel pump 1 and an electromotor 2 which are housed in a cup-shaped housing 3 which comprises a vacuum connection 4 for a fuel hose connected to one end of the housing, the other end of which is closed by a perforated cap 5, on which a pressure connection socket 6 and a non-return valve 7 constituting a pressure valve, are disposed. A seal-like packing member 8 is disposed between the housing 3 and the cap 5. The cap is secured to the housing by bending terminal bar members 9 on the open end of the housing 3. In the housing 3 as viewed in FIG. 1 the fuel enters the housing and passes through a base plate 11 by aperture means, not shown, and is then transported by the pump unit over the electromotor to cool the same and then exits through a check valve positioned in the exit end of the cap 5.

The base plate 11 is provided with a central bore in which a shaft 12 is pressed. An intermediate plate 13 and a supporting plate 14 are disposed axially adjacent to the base plate 11. The base plate, intermediate plate and support plate are clamped together by means of screws 16 and receive between them the pump rotor 17 which is mounted on the shaft 12 via a bearing 18. The pump communicates with the chamber 19 via openings on its suction side which are not shown. The chamber 19 is confined between the curved wall of the housing 3 and the base plate 11. The pressure side of the pump communicates with a chamber 20 which houses the electromotor 2 and leads to the pressure valve 6. A pressure control valve 21 is provided in an aperture in the base plate 11 between chambers 19 and 20, respectively. The connections from the pump to the chambers 19 and 20 are only controlled by the pump rotor but are preferably open channels.

The electromotor 2 consists of an armature formed of a winding 23, armature plates 29, a radial collector 24 and a magnetic part 25.

The motor armature is mounted via journal bearings 27 on the shaft 12. The journal bearings are disposed in the opposite ends of a rigid tube 28 on which the armature plates 29, the armature winding bundle 30 and the commutator bush 31 are attached. The aforementioned elements are attached partly by pressure and partly by means of plastic filler parts which, after the individual elements have been sprayed, ensure a good rotation-locking axial connection. A bush 32 is disposed on the end of the rigid tube 28 which extends toward the pump which includes at least one tang 33 in the manner of a revolving coupling in a complemental recess 34 in the pump rotor 17.

The commutator brushes 35, which are disposed in cages 36, slide on the commutator bush 31. The cages 36 are connected with connection clamps (not represented) disposed outside of the housing 3.

The magnetic part 25 of the electromotor 2 includes a permanent magnet 38 which is disposed in a tubular sheet 39 comprising a magnetically conductive material.

Any radial loads which are exerted on the journal bearings 27 of the motor armature 23 are relatively low. The layer structure of these bearings in the direction of the axis of the shaft 12 is as follows:

a steel backing;
 a copper layer;
 and a porous tin-bronze layer, the pores of which are filled with PTFE and lead.

A circlip 41 is disposed in a groove 40 provided in the shaft 12 and thus serves to restrain the axial forces of the motor armature 23 as well as to prevent these forces from acting on the pump rotor 17 and urging it against its axial limiting wall. A support disk or annulus 42 which can be made of a suitable slippery material is disposed between the circlip 41 and the end of the journal bearing 27 and its rigid tube 28. The other end of the shaft 12 is also provided with a groove 40, a circlip 41 and a support disk 42, all of which form an additional locking device to prevent axial movement of the motor armature 23 in the opposite direction.

The bearing 18 of the pump rotor 17 is preferably constructed of materials which are capable of absorbing relatively powerful radial forces, such as a polyamide or artificial carbon or a roller bearing having satisfactory dry operating properties.

Figure 2:
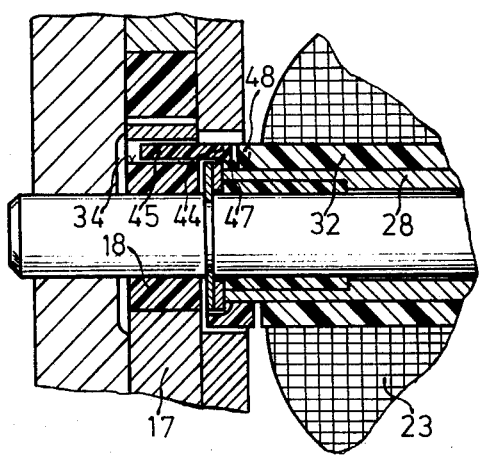
FIGS. 2–5 are longitudinal sectional views of a portion of the other embodiments of the unit.
Figure 3:
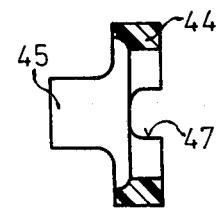

FIGS. 2 and 3 show a further embodiment of this invention in which, as contrasted with the first embodiment shown in FIG. 1, the bearings are not used for a rotation-locking connection between the pump rotor and the motor armature. In this embodiment an intermediate ring 44 is used as the coupling part. The intermediate ring 44 is slipped onto the end of the rigid tube 28 and its integral tang 45 engages in the corresponding recesses 34 of the rotor 17. The ring 44 is provided with at least two recesses 47, as shown. The extensions 48 on the end of the element 32 which is rigidly connected with the motor armature 23, engage in the recesses 47. The relative axial position provided between the pump rotor 17 and the motor armature 23 is ensured by the circlips 41 that are mounted on each end of the shaft supporting the motor armature 23. Accordingly, a rotation-locking connection is permanently ensured by the ring 44. The advantage of this embodiment of the invention is that, apart from the low cost of this type of coupling, no transverse stressing is produced between the rotor and the armature, even when the bearing 18 of the pump rotor 17 is considerably worn. Transverse stresses of this nature would cause additional stressing of the other bearing.

Figure 4:
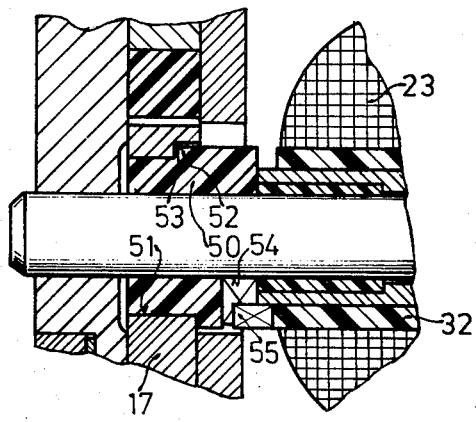

In the third embodiment of the invention shown in FIG. 4 the bearing 50 of the pump rotor projects from the bore 51 of the pump rotor which receives the bearing. The bearing 50 is arranged in the form of a bush which is pressed into the bore 51. A reliable rotation-locking connection between the bush 50 and the rotor 17 is provided by a shoulder portion 52 being used on the journal bearing which extends into a corresponding recess 53 that is available in the pump rotor 17. The recesses 54 in which the tenons 55 on the plastic element 32 engage extend in an axial direction on the journal bearing 50 toward the motor armature 23. Only one of these recesses 54 is shown. The motor armature 23 is supported by the rigid tube 28 or the journal bearing 27 in the axial direction directly on the journal bearing 50. This eliminates axial locking of the motor armature 23 but the pump rotor 17, however, is axially loaded by the motor armature 23. The advantage resides in the very simple type of rotation-locking coupling and in the versatility of the bearing 50 which is capable of more readily absorbing the radial forces than a narrow bearing on account of its elongated shape and is better able also to absorb the axial forces of the motor armature 23.

Polyamide or electrographitized artificial carbon are preferably used for the bearings 18 and 50 of the pump rotor described in the preceding examples. The frictionless properties and resistance of the journal bearings can be improved by the addition of fillers such as graphite. Owing to elevated creep resistance the risk of form variation is relatively low. Thermal expansion is also essentially linear as compared to steel. Polyamide can be availed of in a form of sintering operation to form a suitably prepared rotor. It is also easy to work polyamide by removing burrs or slivers therefrom. In the embodiment of the invention shown in FIGS. 1 and 2 the bearing can expand into the recesses 34 without causing wedging in the direction of the axis of shaft 12. The artificial carbon bearing has excellent temperature resistance and universal chemical resistance. The strength and wear resistance properties of polyamide can be improved by impregnation with coal tar pitch, synthetic resins or metals. Artificial carbon can also be readily worked by removing slivers therefrom.

Figure 5:
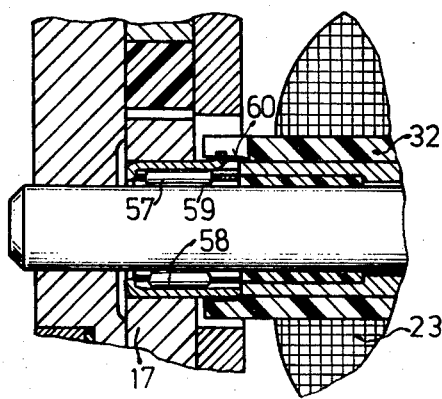

In the fourth embodiment of this invention, shown in FIG. 5, a roller bearing 57 in the form of a needle bearing acts as a bearing for the pump rotor. A roller bearing is suitable for absorbing both powerful radial forces and for dry operation. As in the first two embodiments, tenons can be used as rotation-locking couplings with these tenons being arranged to engage in corresponding recesses. A mass-produced roller bearing could be used for this purpose.

According to one feature of the invention, outwardly projecting tangs 59 are disposed on the outer race 58 of the bearing 57. These tangs 59 are keyed to engage in corresponding recesses 60 provided in the plastic carrier element 32. The roller bearing 57 can also be connected in a rotation-locking manner with respect to the pump rotor 17 by means of an inwardly extending tang. To reduce wear, the cage of the needle bearing can be coated with a solid lubricant such as molybdenum disulfide therm, wolfram sulfide therm or frictionless varnish. The advantage of this bearing in addition to the minimal friction it affords is the high load capacity and the simple form of rotation-locking entrainment.

What is claimed:

1. A fuel supply unit comprising a pump having a rotor and an electromotor having an armature, a rigid mounting shaft common to said pump rotor and said electromotor armature, first bearing means for rotatably mounting said pump rotor on said shaft, second bearing means independent of said first bearing means for rotatably mounting said armature on said shaft independently of said pump rotor, a separate axially extending, coupling member disposed in concentric relationship with said shaft between said pump rotor and said motor armature, means on said coupling member and adjacent portions of said pump rotor and said motor armature arranged for driving engagement to thereby form a driving connection between said motor armature and said pump rotor.

2. A fuel supply unit as claimed in claim 1, in which said first bearing means includes a displaceable ring member that is mounted within a bore in said pump rotor.

3. A fuel supply unit as claimed in claim 1, in which the pump includes a perforated base plate and means spaced therefrom cooperate therewith to support said pump rotor.

4. A fuel supply unit as claimed in claim 3, in which said means spaced from said base plate includes an aperture and a bearing extends axially through said aperture.

5. A fuel supply unit as claimed in 1, in which the pump rotor bore includes radially extending recesses and including tangs on the adjacent portion of said coupling member received in said recesses.

6. A fuel supply unit as claimed in claim 5, in which the motor armature includes extensions supported thereon and including recesses in the adjacent portion of said coupling member in which said extensions are received.

7. A fuel supply unit as claimed in claim 1, in which the shaft of said motor armature includes groove means and retainer means which cooperate therewith to prevent axial movement of said armature.

8. A fuel supply unit as claimed in claim 7, in which said shaft is telescoped by a rigid tubular member that has opposite end portions that terminate adjacent to said retainer means.

9. A fuel supply unit as claimed in claim 8, in which said opposite end portions of said tubular member include journal bearings.

10. A fuel supply unit as claimed in claim 9, in which said journal bearings comprise steel sleeve elements within which is disposed a copper layer provided with a porous tin bronze layer, said last named layer having its pores filled with PTFE and lead.

* * * * *